May 29, 1956　　　　　C. C. HEIN　　　　　2,747,971
PREPARATION OF PURE CRYSTALLINE SILICON
Filed July 20, 1953　　　　　　　　　　　　2 Sheets-Sheet 2

WITNESSES:
E. A. McCloskey.
Leon J. Taja

INVENTOR
Carl C. Hein.
BY
Frederick Shapoe
ATTORNEY

United States Patent Office 2,747,971
Patented May 29, 1956

2,747,971
PREPARATION OF PURE CRYSTALLINE SILICON

Carl C. Hein, Pittsburgh, Pa., assignor to Westinghouse Electric Corporation, East Pittsburgh, Pa., a corporation of Pennsylvania Application July 20, 1953, Serial No. 368,980

8 Claims. (Cl. 23—223.5)

This invention relates to processes and apparatus for preparing crystalline silicon, including single crystals of silicon, of such purity that they may be employed for producing transistors.

While zone melting techniques for preparing purified germanium are employed extensively, such techniques are not readily applied to silicon because of the high melting point of silicon. Thus, while germanium melts at temperatures slightly over 900° C., silicon requires heating to temperatures of over 1420° C. to cause it to melt. This difference in temperatures renders it extremely difficult to melt silicon in conventional apparatus inasmuch as impurities will readily enter into and contaminate silicon at these temperatures from practically any usable material within which the silicon may be disposed. Numerous other problems arise in working above 1400° C. as is well known to those skilled in the art. Consequently, it has been extremely difficult to prepare silicon of the degree of purity required for transistor and similar applications.

The object of this invention is to provide a process for purifying and recrystallizing silicon by utilizing a gold-silicon alloy.

Another object of the invention is to provide a process for purifying impure silicon by traversing through a body of impure silicon a molten zone comprising gold-silicon alloy.

A still further object of the invention is to produce single crystals of silicon by employing a gold-silicon alloy for progressively melting a body of polycrystalline silicon under such conditions that the alloy melts the polycrystalline silicon at one face of the body and rejects essentially pure silicon at the other face, such rejected silicon depositing on a single crystal of silicon and building up thereon.

Another object of the invention is to provide for simultaneously purifying silicon and introducing therein a predetermined amount of a modifying material.

A still further object of the invention is to provide apparatus suitable for treating silicon by zone melting techniques at a temperature considerably below its melting point.

Other objects of the invention will in part be obvious and will in part appear hereinafter. For a better understanding of the nature and objects of the invention, reference should be had to the following detailed description and drawings, in which.

I have discovered that it is possible to employ zone melting techniques in treating silicon by the use of a gold-silicon alloy substantially richer in silicon than is the eutectic composition whereby the silicon may be melted and recrystallized at temperatures far below its normal melting point.

The invention is particularly adapted to treatment of normally pure silicon, that is, silicon with a total impurity content of about 0.01%, to produce therefrom ultra-pure silicon with total impurities of, for instance, less than 1 part in 100,000,000. The purity of the silicon may vary from this value, but it will be generally of this unusual degree.

Figure 1:
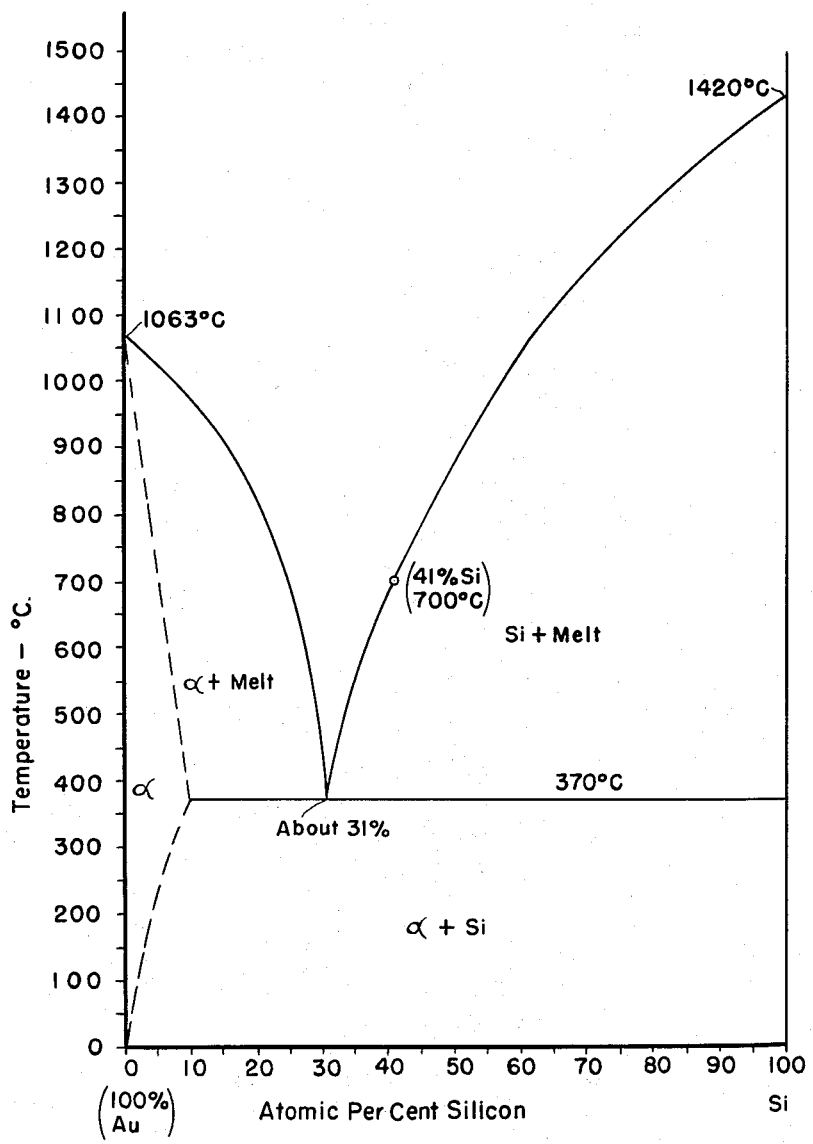
Figure 1 is a constitution diagram plotting the atom percent of silicon and gold-silicon alloys against the temperature.

Referring to Fig. 1 of the drawings, there is illustrated the constitution diagram for gold-silicon alloys. It will be noted that the eutectic comprises approximately 31 atom percent of silicon and approximately 69 atom percent of gold. The gold-silicon eutectic has a melting point of approximately 370° C. Consequently, the eutectic has a melting point considerably below the melting point of pure gold and more than 1,000° C. below the melting point of pure silicon. If a composition comprising 41 atom percent of silicon, the balance being gold, is heated, it will have a melting point of approximately 700° C. If this composition is cooled progressively below 700° C., it will deposit out crystals of silicon and the melt will change in composition to one having less than 41 atom percent of silicon until, at a temperature of 370° C., the melt will comprise 31 atom percent of silicon and will completely solidify as a solid solution. In the process of cooling from 700° C. to 370° C. essentially pure silicon will be deposited from the melt in a quantity equal to the difference between 41 atom percent and 31 atom percent of silicon. Conversely, if the eutectic of gold and silicon is put in contact with a body of silicon and the temperature increased above 370° C., the eutectic will melt and there will be a tendency for the melt to dissolve more silicon with increasing temperatures. This produces a constantly increasing volume of melt which is richer in silicon than is the eutectic as the temperature is increased up to the melting point of silicon, approximately 1420° C.

As silicon crystals are rejected from the gold-silicon alloy melt which is richer in silicon than the eutectic composition as the temperatures drop toward 370° C., they will contain in solid solution an extremely small amount of gold, usually far less than one part of gold in 100 million of the silicon. The following equations enable one to determine the amount of gold or other component which will remain in the recrystallized silicon deposited from the alloy:

$$K = \frac{C_s}{C_L}$$

and $$K = K_m T_m/T$$

where:
$K$=is the segregation constant of an impurity.
$T_m$=temperature of melting point of Si in °K.
$T$=operating temperature in °K.
$K_m$=segregation constant at melting point of Si, of the order of $3 \times 10^{-5}$ for Au in Si.
$C_s$=concentration of impurity in the solid.
$C_L$=concentration of impurity in the liquid.

From these data it can be determined that at 400° C. the silicon rich alloy melt will deposit out silicon having gold in a concentration of approximately $5 \times 10^{-11}$ of the concentration of gold in the melt. Consequently, the amount of gold that will be present in the silicon will be negligible for all practical purposes and the silicon metal will be of an extremely high purity suiting it for transistor applications. By varying the temperature at which the silicon crystals are deposited out of the alloy melt, the content of gold or other material in the silicon can be varied.

Any other materials such as impurities or the like that are dissolved in the gold-silicon alloy melt will tend to deposit out in the silicon crystallized from the melt in accordance with these equations. If $K_m$ is less than 1 for these other materials and their proportion in the melt is quite low, for example 0.01 atom percent or less, then the silicon crystals will contain only traces or infinitesimal amounts of such other materials. With either higher $K_m$ values or higher concentrations of a given material in the melt, or both, as well as by control of the temperature, then the silicon crystals precipitated from the melt will have a higher content thereof. This last condition can be taken advantage of to dope the silicon with elements that will affect the conductivity of the silicon crystals deposited from the alloy melt.

Figure 2:
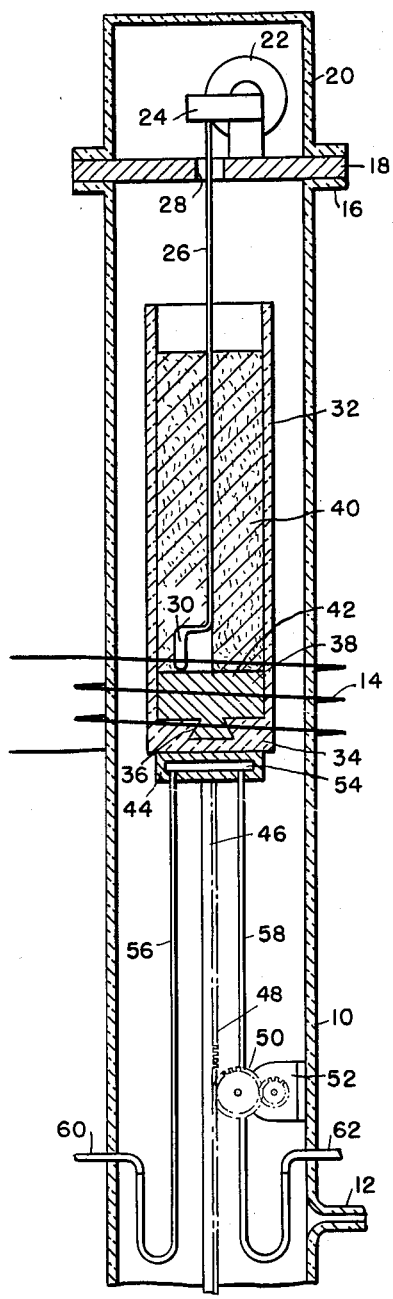
Fig. 2 is a vertical cross section through apparatus constructed in accordance with the invention.

Referring to Fig. 2 of the drawings, there is illustrated apparatus for recrystallizing and purifying a mass of silicon through the use of a gold-silicon alloy body. The apparatus comprises a vertical ceramic cylinder 10 preferably of a heat-resisting glass, such as borosilicate glass or quartz. The cylinder is provided with a nipple 12 to be connected to a vacuum pump so that the interior of the cylinder may be evacuated to an extremely low absolute pressure. An induction heating coil 14 comprising water-cooled tubing, as is well known, encircles a narrow portion of the cylinder 10. At the upper end of the cylinder 10 is a flange 16 upon which is disposed a plate 18, which, in turn, supports a cap member 20. The flange 16, plate 18 and cap member 20 are assembled with a hermetic seal. Supported from the plate 18 within the cap 20 is a motor 22 which operates a suitable reduction gear 24 for revolving a shaft 26 at a speed of, for example, five revolutions per second. The shaft 26 passes through a suitable opening 28 in the plate 18 and projects into the cylinder 10. The shaft 26 is provided at its lower extremity with an offset paddle or stirrer 30 of tungsten carbide or other refractory. The paddle 30 extends into the field of the coil 14 for a reason which will be set forth hereinafter. The stirrer 30 remains in the same location at all times. Within the cylinder 10 is placed a crucible 32 of graphite, quartz or other non-reactive ceramic material. The lower end of the crucible 32 is provided with a heavy base 34 having a hollow 36 of keystone or similar shape characterized by an enlarged bottom and a small surface opening.

At the lower end of the crucible 32 is placed a body 38 of previously prepared gold-silicon alloy. It will be observed that the gold-silicon alloy fills the hollow 36. In practice, the gold-silicon alloy is introduced into the crucible 32 in a molten state and is permitted to solidify at the bottom thereof, as shown. The body 38 of gold-silicon alloy comprises only a relatively small portion of the entire volume of the crucible. Also, the crucible is initially disposed so that the body 38 is at the center of the induction coil 14 where it will be subjected to the maximum temperatures that may be generated therewith.

The gold-silicon alloy may be of eutectic composition but I prefer to use an alloy with silicon well above the eutectic proportion. An alloy containing about 41 atom percent of silicon, for example, is used for the body 38. However, even an alloy richer in gold than the eutectic proportion may be employed, dependence being had on the fact that it will melt silicon in an amount to eventually become richer in silicon than is the eutectic. However, this last procedure is time consuming and ordinarily will not be used.

The remainder of the crucible space above the upper surface 42 of the gold-silicon alloy body 38 is filled with a mass 40 of polycrystalline silicon to be recrystallized and purified. The mass 40 of silicon will ordinarily consist of powder or granules of fairly pure silicon metal. In order to secure the best results, it may be necessary to plate or coat each grain of the silicon with a thin coating of gold. The gold may be applied by electroplating or by chemical displacement methods by placing the silicon metal within an aqueous gold solution of such a nature that the gold will plate out over the surface of the silicon metal by a chemical displacement action. Such gold plated silicon metal will be wetted more readily by the gold-silicon alloy and consequently will dissolve more readily in the alloy.

In order to have a high space factor, the powdered silicon may be compressed at high pressures of 10,000 p. s. i. or higher into a dense compact, provided with a central aperture to accommodate shaft 26, and a slot to receive the stirrer 30 and to permit it to slide out.

The crucible 32 is supported on a plate 44 of graphite, for example. The plate 44 is disposed at the upper end of a bar 46 provided with rack teeth 48 engageable with a gear 50 which, in turn, is driven by a motor 52. The motor 52 can be energized to move the bar 46 whereby the plate 44 and the crucible on it move up or down. Within the plate 44 is a chamber 54 to which a cooling fluid may be supplied by a flexible tube 56 and the fluid withdrawn through a second flexible tube 58. The tubes 56 and 58 may be constructed of silicone rubber. The tube 56 is connected to a suitable nipple 60 sealed into the walls of the conduit 10 and tube 58 is similarly connected to another nipple 62. For the purpose of this invention, suitable cooling fluids to circulate to chamber 54 are gases such as nitrogen or helium, or liquids such as silicone oils or flourinated organic compounds having a low vapor pressure at temperatures of, for example, 200° C.

In practicing the process of purifying silicon in the apparatus of Fig. 2, a suitable source of high frequency electrical energy is connected to the induction coil 14 and energy supplied until the body 38 of gold silicon alloy melts. The gold-silicon alloy has a high density and will remain at the bottom of the crucible in molten form. The crucible may be raised slightly at this time so that the stirrer 30 penetrates entirely into the molten gold-silicon alloy and then the motor 22 is set in operation so that the stirrer rotates and circulates the molten body of gold-silicon alloy 38 throughout the entire succeeding operation. The shaft 26 being disposed to rotate in one position does not appreciably disturb the mass 40.

The maximum temperatures produced by the induction coil 14 are concentrated within a relatively narrow zone including the entire body 38 of gold-silicon alloy and also including the lowermost contacting portion of the silicon metal in the mass 40. The temperatures produced by the heating coil in the body of the gold-silicon alloy are above 370° C., but considerably below the melting point of silicon. In practice, it may be desirable to heat the gold-silicon alloy to a temperature of up to from 700° C. to 800° C. At this temperature, the gold-silicon alloy will begin to dissolve the most adjacent portion of the silicon mass 40 with which it is in contact and thereby the melt will become richer in silicon than the eutectic composition. Thus at 700° C. the alloy will dissolve silicon until it contains 41 atom percent of silicon.

At this time the cooling fluid is passed into the chamber 54 to provide for cooling the lower portion of the crucible 32 to a temperature of about 370° C., or lower, the alloy being at a temperature above 370° C. This results in a temperature gradient which is lowest at the base 34 and reaches a maximum near the upper face of the body 38. The motor 52 is then set in operation to move the bar 46 downward whereby the crucible is slowly lowered. Therefore, the maximum heating zone progresses upwardly toward the mass of the silicon. At the same time, the lower face of the body 38 of gold-silicon alloy, particularly in the hollow 36, cools to a temperature of above 370° C. Consequently, atoms of silicon will be deposited from the melt and will crystallize out within the hollow 36. Owing to the keystone or other locking shape of the hollow 36, the precipitated atoms of silicon will form crystals of silicon which will build up as a solid body that cannot escape therefrom and will, in effect, be locked in place. This is necessary since otherwise the silicon crystals rejected by the melt, being lighter than the gold-silicon alloy, would tend to float upwardly and defeat the practice of the invention.

It is contemplated that a nugget of silicon may be initially placed in hollow 36 in order to assist the silicon atoms from the melt in crystallizing into a single solid mass.

The downward movement of the crucible 32 is continued whereby additional quantities of silicon are dissolved from mass 40 at the upper face 42 of the gold-silicon alloy body 38 and crystals of silicon are deposited out of the melt at the lower face of the body of gold-silicon alloy. The stirrer 30 circulates silicon rich alloy to the lower face while cooler alloy from the lower face which is lower in silicon will move upwardly where it will heat up and will dissolve more silicon from mass 40. The atoms of the silicon thrown out of the alloy melt crystallize on to the previously deposited silicon within the hollow 36 and form a solid body or nugget of silicon. Additional atoms of silicon coming out of the melt attach to and build up thereon so that it eventually fills the lowermost portion of the crucible 32 as one solid member. This process will continue until the entire mass 40 of the silicon has been traversed by the gold-silicon alloy body 38 leaving below it a mass of recrystallized and purified silicon metal. As the top is reached, the crucible is lowered so that the stirrer 30 emerges from the gold-silicon alloy body 38 and then the motors 22 and 52 may be turned off. Similarly, energy is cut off from the heating coil 14 and the entire crucible permitted to cool. The gold-silicon alloy body 38, now at the top of the crucible, is permitted to solidify.

In effect, the process just described has resulted in the melting of the mass 40 of silicon at a temperature far below its melting point. Impurities of a $K_m$ of less than 1.0 originally present in the mass of silicon 40 in amounts of the order of 0.01% or less, or more, even up to 1%, are retained almost entirely within the gold-silicon alloy body 38. A solid ingot of highly purified, recrystallized silicon fills the lower portion of the crucible 32. The crucible may now be removed from the cylinder 10 and broken in order to recover the ingot of pure silicon. The body of gold-silicon alloy may be readily separated from the purified silicon and the alloy purified, if necessary, for subsequent reuse in practicing the process. Due to use of the relatively low temperatures in purifying the silicon practically all the impurities in the silicon are reduced to less than one part in 100 million. Consequently, the silicon is recovered in a form suitable for the most demanding applications such, for example, as transistors, rectifiers, and the like. The process can be repeated if necessary.

However, the purified silicon metal produced by the process just described in connection with Fig. 2 is a polycrystalline body. For many applications, it is necessary that the silicon metal may be obtained in the form of a single crystal. The principles of dissolving at a low temperature by a gold-silicon alloy body may be applied to converting this polycrystalline ingot into a single crystal of silicon metal. It will be understood that polycrystalline silicon derived from any source or produced by any process other than the one described in Fig. 2 may be employed in practicing this second procedure.

A single crystal of silicon may be produced in the apparatus of Fig. 2 if one initially places in hollow 36 a single seed crystal of silicon and locks it in place. The alloy body 38 is then deposited on this single crystal and finally the mass 40 of silicon introduced into the crucible. The heating coil 14 is so disposed and energized that the body 38 is melted and a small portion of the upper part only of the single crystal of silicon is melted. Thereafter the crucible 32 is lowered slowly so that silicon atoms from the melt are deposited on the single crystal of silicon. Consequently, the silicon atoms build up on the single crystal in continuation thereof. By continuing the process the entire mass 40 is deposited as an ultra-pure silicon single crystal.

Figure 3:
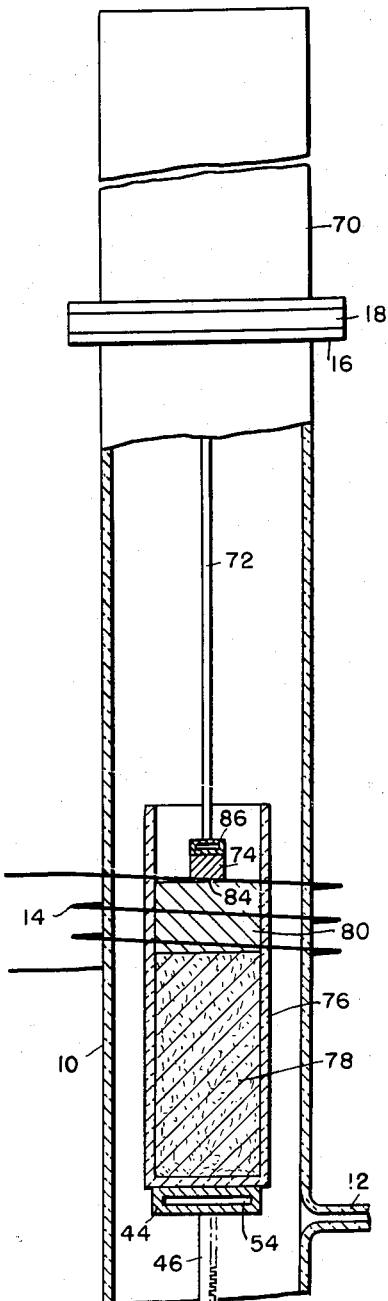
Fig. 3 is a fragmentary vertical cross section through a modification of the apparatus of Fig. 1.

Referring to Fig. 3 of the drawings, there is illustrated another apparatus somewhat better adapted than that of Fig. 2 for producing single crystals of silicon. The same cylinder 10 and a cover 70 cooperating much in the manner shown in the structure of Fig. 2 are employed. However, the rotatable shaft 26 is replaced with a rod 72 which is adapted to hold a seed crystal for single crystal drawing procedures. The rod 72 may not only rotate but may vibrate and be otherwise moved as is well known in single crystal manufacture. The rod 72, however, should be adapted to move upwardly at a controlled rate by a suitable motor and controls therefor. It will be noted that this differs from the shaft 26 and stirrer 30 in Fig. 2 which latter remained in one position throughout the entire process. At the lower end of the rod 72 is attached a single seed crystal 74 of silicon. The single crystal 74 is disposed within the crucible 76 which is filled from the bottom up with a mass 78 of polycrystalline silicon, either the purified ingot derived from the process described with respect to Fig. 2, or a gold plated compact. Above the mass 78 is placed a body 80 of gold-silicon alloy having an upper surface 84 which can be placed in intimate and close contact with the entire lower face of the single crystal 74. Before heating operation the crystal 74 may be positioned slightly above the alloy body 80 to prevent undesirable melting of all the crystal.

The induction heating coil 14 is adapted to energize to maximum temperatures a zone including the entire body 80 of gold-silicon alloy, the lowermost portion of the crystal 74 when in contact with the alloy body and the uppermost portion of the mass 78 of silicon crystals. For most practical operations, the temperatures to be produced in the alloy will be of the order of 700° C. When the body 80 of gold-silicon alloy melts, it will be necessary to lower the crystal 74 and place it in contact with the molten body of alloy. Ordinarily, some surface tension will be operative to maintain the molten gold-silicon alloy in effective contact with the single crystal of silicon. It may be desirable to provide a gas or liquid-cooled plate 86 in contact with the upper end of the silicon crystal 74 which may be fed with a suitable cooling fluid through the interior of the rod 72 much as the plate 44 of Fig. 2 was cooled.

The crucible 76 is slowly elevated by the rod 46 so that the zone of maximum temperature progresses downwardly into the body 78 of polycrystalline silicon. Consequently, the body of gold-silicon alloy 80 will tend to dissolve highly heated silicon with which it comes in contact at its lower face and thereby becomes rich in silicon at its lower face. Natural convection currents and the like will tend to circulate the silicon rich alloy to the upper face of the gold-silicon alloy body 80. The single crystal of silicon 74 drops in temperature as the crucible is lifted upwardly and as fluid is circulated through the plate 86 and consequently gold-silicon alloy in contact therewith also drops substantially in temperature and will begin to eject atoms of silicon from the melt. These atoms of silicon will build up on the single seed crystal 74 and continue the same single crystal structure. Continuing the raising of the crucible 76 will cause the gold-silicon alloy body 80 to progress and melt the entire mass 78 of polycrystalline silicon while at the upper end pure silicon rejected from the melt builds up a large crystal as a continuation of the single crystal 74. At the end of the operation, the body of gold-silicon alloy of slightly above eutectic composition will be disposed at the bottom of the crucible 76 while above it will be a single crystal of silicon. It will be understood furthermore that purification of the silicon will take place in this operation. Consequently, silicon that is impure may be simultaneously purified and converted to a single crystal in the apparatus of Fig. 3 operated as set forth.

Analysis of the process indicates that if the body of gold-silicon alloy is heated to such a temperature that the face of the body in contact with the polycrystalline silicon to be alloyed therewith is at a temperature of 700° C. while the other face is at a temperature of about 400° C., there will be difference in concentration of silicon in the melt of approximately 9 atom percent. Assuming that the silicon deposited from the melt must diffuse a distance of approximately 0.01 centimeter in order to get out of the melt, the maximum rate at which the crucible 76 can be raised is approximately 0.18 mil per second. In practice, however, pulling rates of the order of 10 seconds per mil are employed.

It will be understood that the entire process is carried out in a high vacuum when high frequency heating is employed.

Heating of the gold-silicon alloy may be effected by a narrow ring of graphite, tantalum or other material disposed within the cylinder 10, which is heated by passing an electric current therethrough. The ring encircles the crucible 76 and heats up the contents thereof, with the maximum temperatures being present within a narrow zone. Using this heating procedure, the cylinder 10 may be filled with an inert gas such as helium or argon.

If it is desired to introduce a conductivity modifying constituent into the silicon, as for example, at a concentration of $10^{14}$ to $10^{16}$ atoms per cubic centimeter of silicon, then the gold-silicon alloy body 38 or 89 can be treated to include a quantity of for example 0.1 to 0.0001 atom percent of such constituent. By proper control of temperature at the colder face of the alloy melt there will be deposited silicon with the required proportion of the constituent.

In order to produce recrystallized silicon doped with sufficient phosphorus to have a conductivity of approximately 1 ohm-centimeter, there need be introduced into the melt of gold-silicon alloy phosphorus in an amount of approximately 0.001% by weight. If the colder face of the molten gold-silicon alloy body is at a temperature of 550° C., the silicon deposited from the melt at this temperature will have approximately $2 \times 10^{-7}$ atoms of phosphorus per atom of silicon. At this concentration of phosphorus in the crystals of silicon, the conductivity is 1 ohm-centimeter.

While I have found vertical operating procedures especially well adapted to the present process because of the higher density of the gold-silicon alloy than the silicon, the process can be carried out horizontally by using suitable precautions to prevent the alloy from flowing under or undercutting the silicon mass being purified. In order to work horizontally, the horizontal boat or crucible should be fitted with a solid mass of silicon to be purified exactly filling the crucible. This can be accomplished if the silicon mass is melted in the crucible and solidified therein, leaving a space for the body of gold-silicon alloy by introducing a refractory plug at one end, and the plug removed when the silicon is solidified.

It will be understood that the above description and drawing are exemplary and not limiting of the process and apparatus since the apparatus can be constructed and operated in different ways without departing from the spirit of the invention.

I claim as my invention:

1. In the process of recrystallizing a mass of silicon, the steps comprising preparing a longitudinally disposed mass of silicon to be recrystallized, applying in contact with one end of the longitudinally disposed mass a body of gold-silicon alloy having not in substantial excess of about 69 atom percent of gold, heating a narrow zone comprising the body of the alloy and the immediate adjacent silicon to a temperature above the melting point of the gold-silicon alloy but substantially below the melting point of silicon, the means producing such heating concentrating the maximum temperatures to a relatively narrow zone including the body of gold-silicon alloy and only a small part of the immediately adjacent mass of silicon, the temperature at the face of the body furthest removed from the mass of the silicon being maintained at a temperature substantially less than at the face in contact with the mass of silicon, slowly advancing the heated zone into the mass of the silicon whereupon silicon heated to the said maximum temperatures alloys with the molten gold-silicon alloy at the face with which it is in contact to produce more molten alloy rich in silicon at the advancing side of the zone, while at the receding side of the zone the gold-silicon alloy is cooled and thereupon deposits out silicon, the body of molten gold-silicon alloy thereby advancing with the advance of the heating means, and continuing such advancing of the heated zone through the longitudinally disposed mass of silicon and simultaneously traversing the molten gold-silicon alloy therethrough, whereby the silicon is dissolved in the alloy and recrystallized therefrom.

2. The process of claim 1 wherein a single crystal of silicon is placed in contact with the face of the body of gold-silicon alloy opposite to the face in contact with the mass of silicon to be recrystallized, and the silicon atoms from the melt are deposited on the single crystal and thereby build up the single crystal.

3. The process of claim 1 wherein a desired constituent is dissolved in the gold-silicon alloy in such selected amount that the silicon crystals deposited from the colder face of the melt of gold-silicon alloy, contain a predetermined proportion of the desired constituent.

4. The process of claim 1, wherein the longitudinally disposed mass of silicon is arranged in a substantially vertical direction.

5. The process of claim 4, wherein the body of gold-silicon alloy is initially applied to the lower end of the vertically arranged mass of silicon and at the end of the advance of the heating means has reached the top of the mass.

6. The process of claim 4 wherein the molten body of gold-silicon alloy is stirred to circulate the silicon rich portion to the cooler face and the cooler alloy is brought to the hotter portion to enable it to be heated and to dissolve silicon from the mass.

7. The process of claim 6 wherein the first atoms of silicon in the solid state deposited out of the molten gold-silicon alloy body at its cooler side are physically held in place so that they do not float upwardly in the body of molten alloy, and succeeding silicon atoms deposited out of the melt are affixed to the solid silicon held in place.

8. In the process of recrystallizing a mass of polycrystalline silicon into a single crystal, the steps comprising arranging the polycrystalline silicon in an elongated mass disposed in a substantially vertical direction, placing upon and in contact with the upper end of the elongated mass of silicon a body of gold-silicon alloy having less than 69 atom percent of gold, placing upon and in contact with the upper end of the body of the gold-silicon alloy a single seed crystal of silicon, heating a zone of the assembled mass, body and crystal to a temperature above 370° C. and below the melting temperature of silicon, the means producing such heating initially concentrating the maximum temperatures to have the zone include all of the body of gold-silicon alloy, the part of the single seed crystal nearest the body and a part of the polycrystalline silicon mass nearest the body, cooling being effected at the part of the single crystal of silicon removed from the body, moving the heated zone downwardly with respect to the mass of polycrystalline silicon whereupon polycrystalline silicon heated to the said maximum temperatures alloys with the molten gold-silicon alloy with which it is in contact to produce more molten alloy rich in silicon at the point of such contact and the recession of the heated zone in the area adjacent the single crystal causes cooling of the gold-silicon alloy to a temperature such that silicon atoms are deposited from the alloy and crystallize out on the single seed crystal, the body of gold-silicon alloy thereby advancing downwardly, and continuing the relative lowering of the heating zone until the gold-silicon alloy has traversed the polycrystalline mass of silicon and the silicon deposited out at the upper end of the body of gold-silicon alloy has formed a single crystal from the original single seed crystal of silicon.

References Cited in the file of this patent

UNITED STATES PATENTS

| | | |
|---|---|---|
| 745,122 | Tone | Nov. 24, 1902 |
| 2,402,582 | Scaff | June 25, 1946 |
| 2,631,356 | Sparks et al. | Mar. 17, 1953 |

OTHER REFERENCES

Pfann: "Journal of Metals," vol. 4, pages 747–753, July 1952.

Pfann: "Journal of Metals," vol. 4, pages 861–865, Aug. 1952.

Moissan et al.: "Compt. Rendu," vol. 138, pages 657–611, 1299–1302, (1904).